Aug. 28, 1962
F. W. McKINLEY
3,051,128
REGULATING MEANS
Filed Aug. 11, 1960
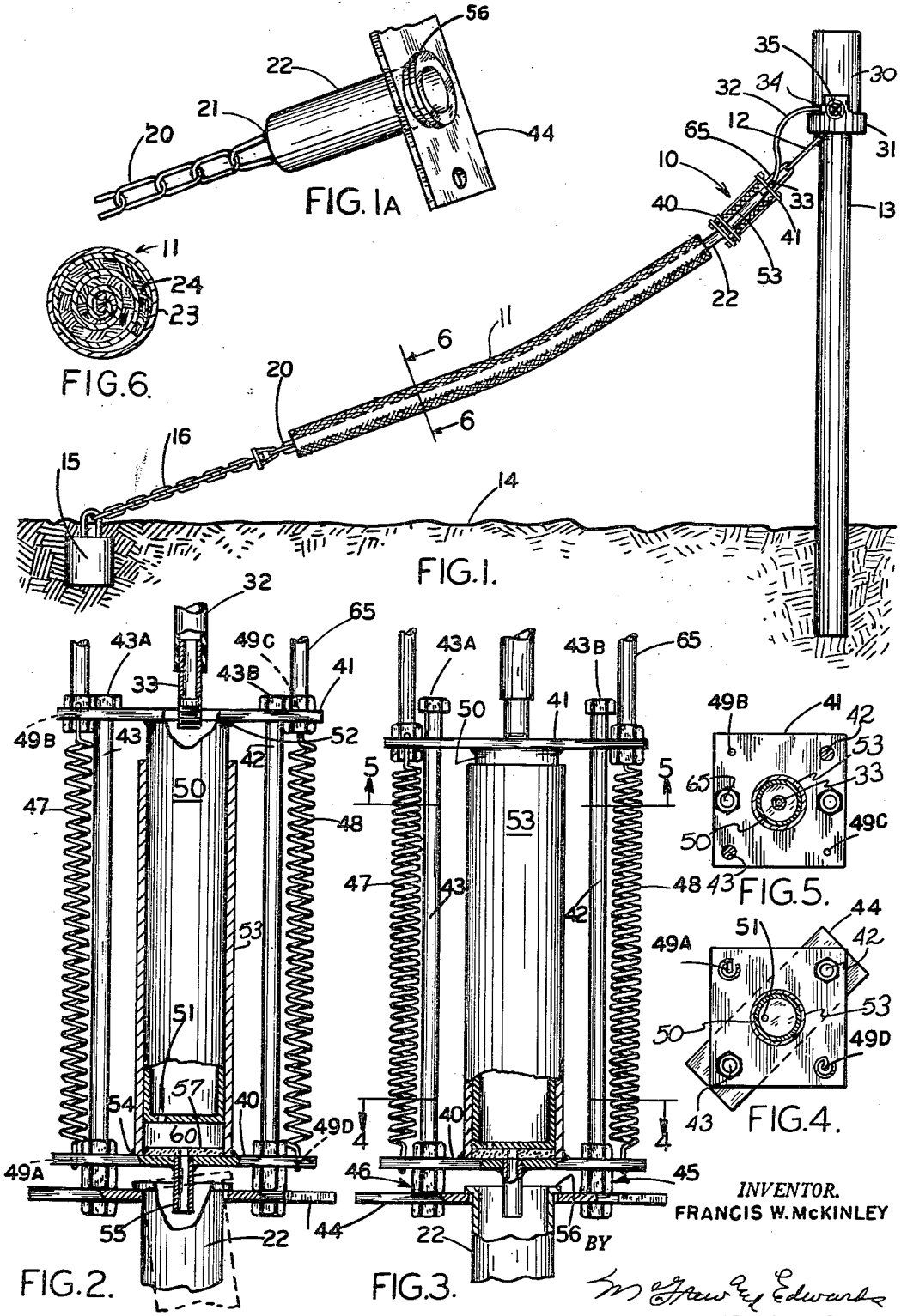
INVENTOR.
FRANCIS W. McKINLEY
BY
ATTORNEYS

United States Patent Office 3,051,128
Patented Aug. 28, 1962

3,051,128
REGULATING MEANS
Francis W. McKinley, 121 E. Costilla,
Colorado Springs, Colo.
Filed Aug. 11, 1960, Ser. No. 49,037
8 Claims. (Cl. 119—157)

This invention relates to apparatus for metering the flow of insecticides and the like to animal-contact insecticide applicators, and more particularly to automatic flow regulating and metering means for use with animal insecticide applicators which are adapted to be actuated by animal use of such applicators.

The instant invention represents improvements in animal-contact insecticide applicators of the type disclosed in Patent Reissue No. 23,986 issued to W. K. McKinley.

It is well known that certain insects and parasites breed on the skin and hair of cattle producing undesirable diseases and other deleterious effects. Certain types of applicators, as represented by the above reissued patent, have been developed for applying insecticides and the like to animals. These applicators make use of the habit of such animals to rub and scratch themselves on nearby objects to relieve irritation caused by such insects and parasites. However, these prior applicators have necessitated "batch-type" filling operations. And with such batch filling operations, intermittent and varying amounts of use by the cattle, changing weather conditions and the like, have made it difficult to provide constant and even application of insecticide material over a period of time without constant attention.

With my invention, it is possible to provide an animal actuated metering and regulating device for controlling the flow of such insecticide materials from a storage container to an actuator and to thereby maintain a substantially even distribution of insecticide from the actuator to the animals without the necessity of constant attention.

Briefly, apparatus embodying my inventive concept may be comprised essentially of a pair of resiliently interconnected frame members carrying a plurality of tubular members therebetween; a portion of such tubular members coact in a pump-like action to regulate and meter the flow of insecticide materials from a storage container to an applicator, and it is interconnected so as to be actuated by animal use of such an applicator. Further details of the construction of my invention will become clearer from a study of the description of the drawings set forth hereafter.

It is thus among the objects and advantages of my invention to provide novel means for regulating and metering the flow of insecticide materials to an animal-contact applicator; which is simple in construction, easily manufactured, does not require frequent attention, and which is of rugged enough construction to withstand the stresses to which it is subjected by animal usage.

It is further among the objects of my invention to provide flowing regulating and metering means for use with an insecticide applicator which is actuated by animal use, and which combines functions of a pump with its regulating and metering features.

Further advantages and novel features of my invention will become obvious to those skilled in the art from a study of the following description of the exemplary drawings, in which:

FIG. 1 is a side elevational view of a regulating and metering device embodying my inventive concepts as arranged with an insecticide applicator;

FIG. 1a is an enlarged fragmentary detail of the connection between the applicator and regulating means of FIG. 1 and indicating the universal-like swivel relation therebetween;

FIG. 2 is an enlarged side elevational view in partial section of the regulating and metering device of FIG. 1 in the open position;

FIG. 3 is an enlarged fragmentary detail in partial section of the regulating and metering device of FIG. 2 in the closed position;

FIG. 4 is a section of the device of FIG. 2 taken along line 4—4;

FIG. 5 is a section of the device of FIG. 2 taken along line 5—5; and

FIG. 6 is an enlarged detail along the line 6—6 of FIG. 1.

Before describing the drawings in detail, I wish to make it clear that they are but exemplary of one manner of practicing my invention and I do not wish to be limited thereby since it is my intention that the appended claims cover all modifications within the spirit and scope of my invention.

A metering device according to my invention is generally indicated by reference character 10 in FIG. 1 and is connected between an applicator 11 and a U-bolt 12 fixedly secured to the vertical support 13. The vertical support is appropriately fixed in position in the ground 14. The opposite end of the applicator 11 is interconnected to a deadman 15 by a length of chain 16. The deadman 15 is spaced a sufficient distance from the base of the support 13 to provide the desired angular configuration shown in FIG. 1.

A length of chain, cable, strap iron or the like 20 passes through the interior of the applicator 11 and coacts therewith in a manner described in detail in Reissue Patent No. 23,986. One end of the chain 20 is swivelly interconnected with the chain 16 and the opposite end is preferably fixedly secured, as by welds 21, to the tubular swivel extension portion 22 of the regulator 10 (see FIG. 1a).

The applicator is of the type which consists of a canvas, woven metal or other cover 23 suitably encompassing felt-like material 24 (FIG. 6). A supply or storage means 30 is supported above but adjacent to the metering and regulating device 10, such as by placing it in a suitable support tray 31 adjacent the top of the vertical support 13. The storage or supply means may be such as a five gallon can.

A flexible conduit 32 is connected between the inlet 33 of the metering and regulating device and the outlet 34 of the storage device. Means such as a gate valve 35 is inserted in the line 32 between the storage means outlet 34 and the metering and regulating means inlet 33. If desired, the gate valve could be inserted in the storage device.

A regulating and metering device within my inventive concepts may include a pair of parallel, spaced planar frame members 40 and 41 interconnected by elongated bolts 42 and 43. A third planar frame member 44 is spaced from planar frame member 40 and statically held in position relative thereto by the nut arrangements indicated by reference characters 45 and 46. Each of these nut arrangements is comprised of three nuts, one placed between the planar members 40 and 44, and one on the other side of each of the planar members—all three being threaded on the ends of the bolts 42 and 43.

A pair of relatively tightly coiled resilient means or springs 47 and 48 are interconnected between the planar members 40 and 41 as by passing the respective ends thereof through openings such as openings 49a, 49b, 49c and 49d. When the regulating and metering device is in its closed configuration, the springs maintain the planar members 40 and 41 in the position as shown in FIG. 3. When cattle come in contact with the applicator 11 and proceed to rub against it, the regulating and metering device opens to the position shown in FIG. 2. The magnitude of the distance which the device may open is limited by limit means such as the bolt heads 43a and 43b. After the cattle cease rubbing, the springs return the device to the closed position of FIG. 3. Regulation of the rate of flow through the regulating device may be obtained by adjusting the position of the nut assemblies 45 and 46 to change the magnitude of the stroke of the device. In addition, the length of the bolts 42 and 43 may be changed to accomplish greater or lesser changes of stroke.

When the device is in the open position, fluid from the storage means 30 as controlled by the gate valve 35, flows by gravity through the flexible tube 32, the inlet 33 and into the tubular member 50. The inlet 33 is of an externally threaded configuration for threaded engagement with complementary internal threads of the frame member 41. Alternative means, such as welding or the like, are also usable to connect the inlet and the frame member 41. The tubular member 50 is fixedly secured to the frame member 41 as by welds 52. The other frame member 40 has a second tubular member 53 secured thereto as by welds 54 and is positioned to encompass and be concentric with the tubular member 50.

Opening from the bottom of the tubular member 53 and through the frame member 40 is outlet 55. The outlet 55 opens into the tubular member 22 through its top. The upper peripheral edge of the tubular member 22 carries a collar 56. The collar 56 is adapted to bear against the frame member 44 which serves as a bearing surface for the swiveling action. A suitable washer 57 (preferably leather) is placed in the bottom of the tubular member 53 and is described in detail hereafter.

Insecticide material which passes into the tubular member 50 from the inlet 33 passes through the small opening 51 in the bottom thereof and into the tubular member 53 and thence through outlet 55 into the member 22 and along the chain 20 for saturating the entire length of the applicator 11.

The tubular members 50 and 53 form a piston-like arrangement, i.e., the outside diameter of the tubular member 50 and the inside diameter of the tubular member 53 are substantially the same, being only of sufficient difference to allow a relatively tight sliding relationship. Therefore, when the cattle rub against the applicator and move the regulator to the open position, the separation between the bottoms of the tubular member 50 and the tubular member 53 cause a reduced pressure to exist in the area indicated by 60. This reduced pressure acts to draw liquid through the opening 51. The continued rubbing by the cattle, and the variation in the pressure which is applied in doing so, acting in concert with the springs, cause the area 60 to constantly change volume and move between and from the closed configuration of FIG. 3 to the open configuration of FIG. 2. This movement serves to provide a pump-like action in the metering and regulating device. It is thus seen that the spring is the sole means for holding the parts of the metering and regulating device in operative relation and normally urging the device to a closed position. The springs further serve to maintain and hold the chain support and insecticide absorbent applicator in a taut position when not in use.

The relationship between the collar 56 of tubular member 22 and the frame members 44 and 40 is of a sufficiently spaced and loose character to allow a limited universal-like swivel movement between them to such positions as generally indicated by dotted lines in FIG. 2. This limited swivel movement tends to overcome breakage of the regulator due to excessive strain.

Although I have shown the outlet 55 as substantially centrally located in the bottom of the tubular member 53, it is anticipated that it may be positioned elsewhere such as adjacent the walls of the tubular member 53. However, when it is not centrally located, it is necessary that it be spaced from a position of registry with the opening 51 so that the leather washer 57 may serve to prevent flow therebetween when the device is in its closed position.

The planar members 40 and 41 (FIGS. 3 and 4) are preferably of an enlarged configuration relative to the tubular members 50 and 53 in order that the desired spacing of the bolts 42 and 43 and the springs 47 and 48 may be accomplished. The other frame member 44 may be of the same configuration, although I prefer to make it smaller to save materials. The criterion for its size, is dicated by the spacing of the bolts 42 and 43 and the strength necessary to restrain the collar 56 of the tubular member 22.

Secured to the planar member 41 is a suitable U-shaped attaching device 65 for supporting the device 10 from the swivel 12.

Therefore, in operation, the supply or storage device 30 is filled with a suitable insecticide material. The gate valve 35 is adjusted to furnish the desired flow from the storage container through the flexible tube 32 (I prefer to make this flexible tube of neoprene rubber or the like since it withstands weathering) and the other end of the tube is suitably connected with the inlet 33 of the metering and regulating device. When installed in the foregoing manner, the springs, or other resilient means, maintain the regulator in a closed and inoperative position when not in use. Cattle coming in contact with the applicator and rubbing against it exert pressures which are transmitted through the tubular member 22 to move the frame members 41 and 40 apart and open the metering and regulating device. The insecticide then proceeds to flow through the metering and regulating device into the applicator. Continued rubbing, and variations in the pressure exerted, cause the tubular members 50 and 53 to move back and forth relative to each other in a pump-like manner, thereby overcoming air locks during pumping action, thereby aiding the gravity flow of insecticide. When properly set, the air locks help to stop flow when pump is held open, i.e., if an animal merely leans against the applicator and holds the device open as in FIG. 2. Thus, the air lock prevents flow.

Having thus described my invention with sufficient clarity to enable those skilled in the art to practice it, what I wish to have protected by Letters Patent is set forth in the following claims.

What is claimed is:

1. A regulating and metering device having a frame inclusive of spaced apart frame members interconnected by resilient means, at least a pair of tubular members mounted on said frame members and adapted to coact and move in a piston-like manner, means defining an inlet opening into a first of said tubular members, means defining an outlet opening from a second of said tubular members, means cooperative between said first and second tubular members to prevent flow from said first tubular member to said second tubular member when the device is in a closed position, and limit means on said frame arranged to limit the magnitude of said piston-like movement, and said second tubular member encompassing a major portion of the first tubular member throughout the range of said piston-like movement.

2. A regulating and metering device having at least a pair of spaced apart frame members interconnected by resilient means, at least a pair of tubular members mounted to coact and move in a piston-like manner, a first of said tubular members mounted on a first of said frame members, a second of said tubular members mounted on a second of said frame members with a major portion thereof encompassed by said first tubular member, means defining an inlet opening into said second tubular member, means defining an opening from said first tubular member to said second tubular member, and valve means cooperative between said first and second tubular members to prevent flow from said first tubular member to said second tubular member when the regulating and metering device is in a closed position, and said second tubular member encompassing a major portion of the first tubular member throughout the range of said piston-like movement.

3. A regulating and metering device having at least a pair of substantially parallel, planar spaced apart frame members interconnected by resilient means, at least a pair of concentric tubular members mounted to coact and move in a piston-like manner, a first of said tubular members mounted on a first of said frame members and a second of said tubular members mounted on a second of said frame members, means defining an inlet opening into said first tubular member, means defining an outlet opening from said second tubular member, means to prevent flow from said first tubular member to said second tubular member when the regulator is in a closed position, and means mounted on said frame members arranged to limit the magnitude of said piston-like movement, and said second tubular member encompassing a major portion of the first tubular member throughout the range of said piston-like movement.

4. A regulating and metering device having at least a pair of spaced apart frame members interconnected by resilient means, at least a pair of tubular members mounted to coact and move in a piston-like manner, a first of said tubular members mounted on a first of said frame members, a second of said tubular members mounted on a second of said frame members with a major portion thereof encompassed by and concentric with said first tubular member, means defining an opening into said second tubular member from said first tubular member, and valve means cooperative between said first and second tubular members to prevent flow from said first tubular member to said second tubular member when the regulating and metering device is in a closed position, and said second tubular member encompassing a major portion of the first tubular member throughout the range of said piston-like movement.

5. An insecticide regulating and metering device adapted for use with an animal contact type insecticide applicator inclusive of at least a pair of spaced apart frame members interconnected by overcomable means, at least a pair of tubular members mounted between said frame members and adapted to coact and move in a pump-like manner, means defining an inlet opening into a first of said tubular members and means defining an outlet opening from a second of said tubular members, means to prevent flow between the first tubular member and the second tubular member when the device is in a closed position, a third frame member spaced from the said pair of frame members adjacent the outlet, said third frame member interconnected with limited-universal swivel means which are adapted to be interconnected with applicating means, limit means interconnected with said frame members for limiting the pump-like movement, and said second tubular member encompassing a major portion of the first tubular member throughout the range of said pump-like movement.

6. An insecticide regulating and metering device adapted for use with an animal contact type insecticide applicator having a frame inclusive of at least a pair of parallel, spaced apart frame members interconnected by overcomable means, at least a pair of tubular members mounted between and carried by said frame members and adapted to coact and move in a pump-like manner, means defining an inlet opening into a first of said tubular members and means defining an outlet opening from a second of said tubular members, means to prevent flow between the first tubular member and the second tubular member when the device is in a closed position, a third frame member spaced from the said pair frame members and mounted adjacent the outlet, said third frame member coacting with limited-universal means adapted to be interconnected with applicating means, limit means mounted on said frame members for limiting said pump-like movement, and said second tubular member encompassing a major portion of the first tubular member throughout the range of said pump-like movement.

7. An insecticide regulating and metering device adapted for use with an animal contact type insecticide applicator inclusive of at least a pair of parallel spaced apart frame members interconnected by overcomable means, at least a pair of concentric tubular members mounted between and carried by said frame members adapted to coact and move in a pump-like manner, means defining an inlet opening into a first of said tubular members and means defining an outlet opening from a second of said tubular members, means to prevent flow between the first tubular member and the second tubular member when the device is in closed position, a third frame member parallel to, spaced from, and carried by the said pair of frame members, said third frame member interconnected with said outlet and adapted to allow limited universal movement between said device and applicator means with which it is used, and limit means interconnected with said frame members for limiting said pump-like movement, and said second tubular member encompassing a major portion of the first tubular member throughout the range of said pump-like movement.

8. The device of claim 7 in which the overcomable means are at least a pair of spaced apart springs.

References Cited in the file of this patent
UNITED STATES PATENTS

| | | |
|---|---|---|
| 1,294,205 | Van Dyke | Feb. 11, 1919 |
| 1,579,567 | Schriner | Apr. 6, 1926 |
| 2,766,726 | Duff | Oct. 16, 1956 |